(12) United States Patent
Yamada

(10) Patent No.: US 9,617,947 B2
(45) Date of Patent: Apr. 11, 2017

(54) FUEL INJECTION CONTROL DEVICE

(75) Inventor: Naoyuki Yamada, Kariya (JP)

(73) Assignee: DENSO CORPORATION, Kariya (JP)

(*) Notice: Subject to any disclaimer, the term of this patent is extended or adjusted under 35 U.S.C. 154(b) by 1481 days.

(21) Appl. No.: 13/309,692

(22) Filed: Dec. 2, 2011

(65) Prior Publication Data

US 2012/0145805 A1    Jun. 14, 2012

(30) Foreign Application Priority Data

Dec. 10, 2010  (JP) ................. 2010-275898

(51) Int. Cl.
*F02D 41/40* (2006.01)
*F02D 41/24* (2006.01)
*F02M 47/02* (2006.01)
*F02M 57/00* (2006.01)

(52) U.S. Cl.
CPC ....... *F02D 41/402* (2013.01); *F02D 41/2467* (2013.01); *F02D 2200/0602* (2013.01); *F02D 2250/04* (2013.01); *F02M 47/027* (2013.01); *F02M 57/005* (2013.01); *Y02T 10/44* (2013.01)

(58) Field of Classification Search
CPC ............. F02D 2200/0602; F02D 41/40; F02D 2250/04; F02D 41/2467; F02D 41/402; F02D 2200/0604; F02D 2200/0618; F02D 41/401; F02D 2041/2055; Y02T 10/44; F02M 57/005
USPC ... 73/35.12, 114.38, 114.43, 114.45, 114.51; 123/585.1; 239/479, 480, 486, 494, 673; 701/103, 104, 105, 107, 115
See application file for complete search history.

(56) References Cited

U.S. PATENT DOCUMENTS

| | | | |
|---|---|---|---|
| 6,729,297 B2* | 5/2004 | Futonagane | F02D 41/3836 123/294 |
| 7,305,972 B2* | 12/2007 | Kloos | F02D 41/008 123/479 |
| 8,175,789 B2 | 5/2012 | Kojima et al. | |
| 2003/0029417 A1* | 2/2003 | Zimmermann | F02D 41/402 123/299 |
| 2008/0228374 A1 | 9/2008 | Ishizuka et al. | |
| 2009/0056678 A1 | 3/2009 | Nakata et al. | |

(Continued)

FOREIGN PATENT DOCUMENTS

| JP | 2005-171931 | 6/2005 |
|---|---|---|
| JP | 2007-023796 | 2/2007 |

OTHER PUBLICATIONS

Japanese Official Action dated Oct. 23, 2012 issued in corresponding Japanese Application No. 2010-275898, with English translation.

*Primary Examiner* — Sizo Vilakazi
(74) *Attorney, Agent, or Firm* — Nixon & Vanderhye P.C.

(57) ABSTRACT

A waveform detector detects a variation in fuel pressure based on a detection value of a fuel pressure sensor as a fuel pressure waveform. A determining portion determines whether an interval between injections is zero or smaller than a predetermined value based on the detected fuel pressure waveform when multi-step-injection is performed. A correcting portion corrects an injection command signal indicative of an injection start timing and an injection end timing corresponding to a target injection state in a manner that the interval is increased when the interval is determined to be zero or smaller than the predetermined value.

10 Claims, 7 Drawing Sheets

(56) References Cited

U.S. PATENT DOCUMENTS

| | | | |
|---|---|---|---|
| 2009/0063016 A1* | 3/2009 | Nakata | F02D 41/2096 |
| | | | 701/103 |
| 2009/0301431 A1* | 12/2009 | Kawarabayashi | F02M 45/02 |
| | | | 123/299 |
| 2010/0250095 A1 | 9/2010 | Yamada et al. | |
| 2010/0250102 A1* | 9/2010 | Imai | F02D 41/3863 |
| | | | 701/105 |
| 2012/0185155 A1 | 7/2012 | Nakata et al. | |

* cited by examiner

INJECTION-TIME FUEL PRESSURE WAVEFORM Wa

NON-INJECTION-TIME FUEL PRESSURE WAVEFORM Wu

INJECTION WAVEFORM Wb (Wb = Wa − Wu)

FIG. 8
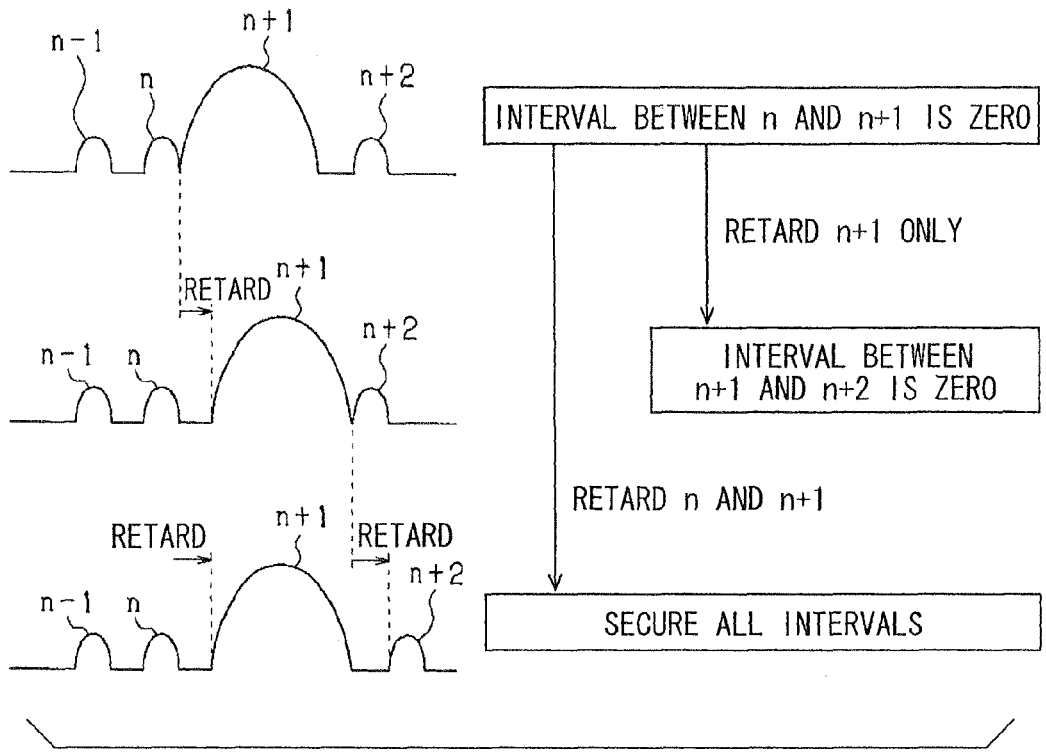
FIG. 9A
FIG. 9B
INTERVAL SHORTAGE
(Tint<Tth)
FIG. 9C
UNITED INJECTION

FUEL INJECTION CONTROL DEVICE

CROSS REFERENCE TO RELATED APPLICATION

This application is based on Japanese Patent Application No. 2010-275898 filed on Dec. 10, 2010, the disclosure of which is incorporated herein by reference in its entirety.

BACKGROUND OF THE INVENTION

1. Field of the Invention

The present invention relates to a fuel injection control device.

2. Description of Related Art

JP-A-2008-144749 (US 2008/0228374), JP-A-2009-74535 (US 2009/0056678), or JP-A-2010-223185 (US 2010/0250095) describes a fuel pressure sensor which detects a pressure of fuel downstream of a common rail (pressure accumulating container), and a fuel injection system which detects a variation in fuel pressure generated by a fuel injection as a fuel pressure waveform.

Specifically, a point of inflexion in a start of lowering in the fuel pressure is detected in the fuel pressure waveform, and an actual injection start time is detected based on the time when the point of inflexion appears. A delay period "td" from an injection start time indicated to a fuel injection valve from the actual injection start time is learned. A command signal of the injection start time is set based on the learned delay period "td" in a manner that a target injection start time corresponds to an operation state of an engine with high accuracy.

FIG. 9A is a chart illustrating a variation in injection rate when multi-step-injection is performed in a single combustion cycle. As shown in FIG. 9B, if an interval Tint between injection steps becomes small in a target injection state (the number of injection steps, injection amount and injection start time), the injection steps may be united (integrated) as shown in a dashed line of FIG. 9C. In this case, because combustion state in cylinder becomes different from a predetermined one, gas emission properties may become worse, or output torque variation may be generated.

When the learning of the delay period "td" is in its early state, and when a value of the learning is left as an initial value, actual injection start/end time is deviated from a predetermined value. In this case, actual interval becomes smaller than a required one, and the united injection may be occurred, with high possibility.

SUMMARY OF THE INVENTION

The present invention is made in view of the above matters, and it is an object of the present invention to provide a fuel injection control device that reduces the possibility of the united injection.

According to an example of the present invention, a fuel injection control device includes a fuel injection valve, a fuel pressure sensor, a command portion, a waveform detector, a determining portion, and a correcting portion. The fuel injection valve injects fuel accumulated in an accumulator. The fuel pressure sensor detects a fuel pressure in a fuel passage defined to extend from an outlet of the accumulator to an injection port of the fuel injection valve. The command portion sets an injection command signal indicative of an injection start timing and an injection end timing based on a target injection state that is set in accordance with an operation state of an engine, and outputs the injection command signal into the fuel injection valve. The waveform detector detects a variation in fuel pressure based on a detection value of the fuel pressure sensor as a fuel pressure waveform when the variation is generated by a fuel injection. The determining portion determines whether an interval between injections is zero or smaller than a predetermined value based on the detected fuel pressure waveform when multi-step-injection is performed. The correcting portion corrects the injection command signal corresponding to the target injection state in a manner that the interval is increased when the interval is determined to be zero or smaller than the predetermined value.

Accordingly, the interval can be secured between the injection steps.

BRIEF DESCRIPTION OF THE DRAWINGS

The above and other objects, features and advantages of the present invention will become more apparent from the following detailed description made with reference to the accompanying drawings. In the drawings:

FIG. 8 is a chart illustrating an example of a retard correction performed based on FIG. 6; and FIG. 9A is a chart illustrating a variation in injection rate when multi-step-injection is performed in a single combustion cycle, FIG. 9B is a chart illustrating a small interval between injection steps, and FIG. 9C is a chart illustrating a united injection.

DETAILED DESCRIPTION OF PREFERRED EMBODIMENT

An embodiment of a fuel injection control device according to the present invention will be described. The fuel injection control device is applied to an internal combustion engine (diesel engine) having four cylinders #1-#4, in which compression self-ignition combustion is generated by injecting high pressure fuel.

Figure 1:
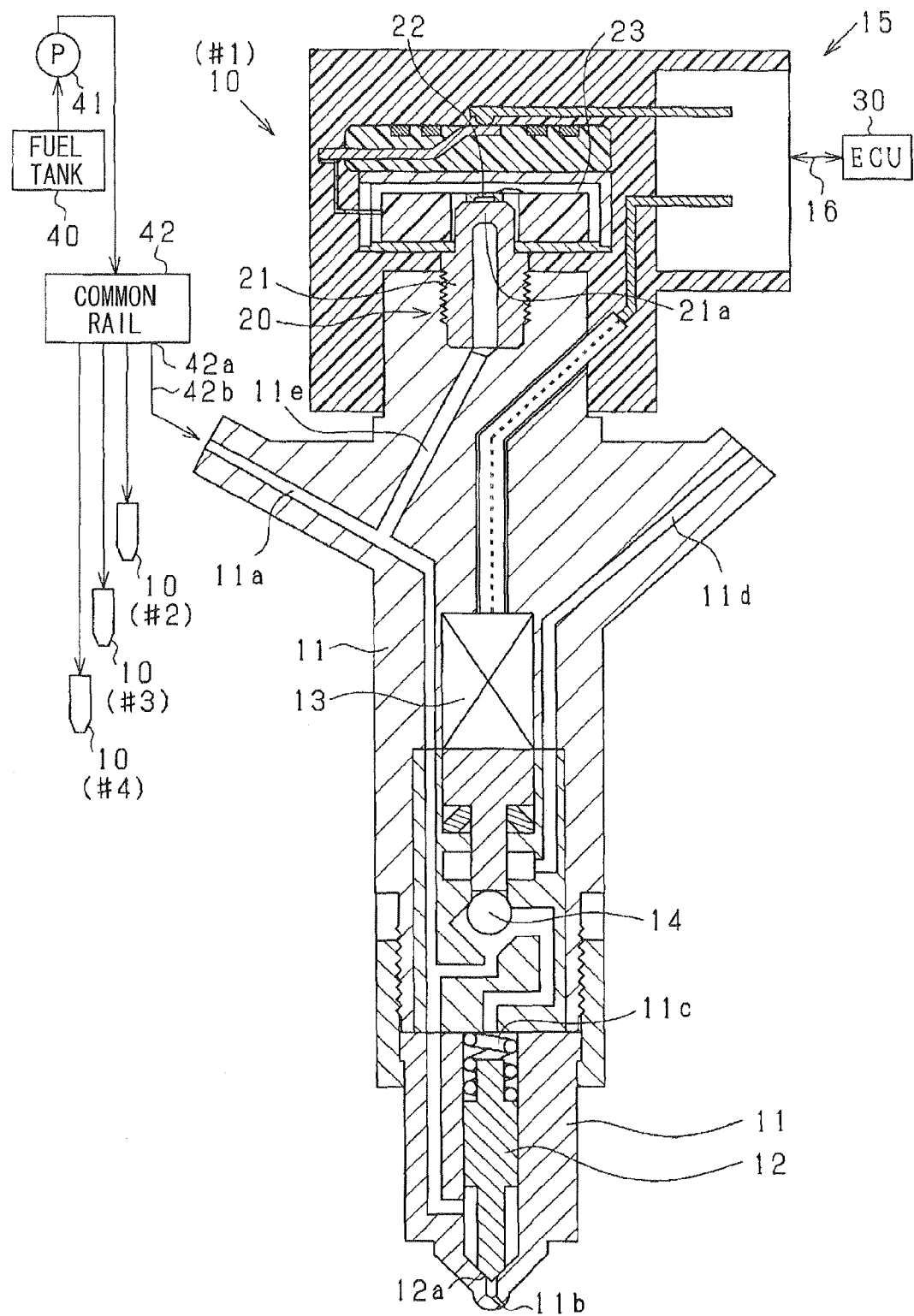
FIG. 1 is a construction diagram illustrating an outline of a fuel injection system having a fuel injection control device according to an embodiment of the present invention.

As shown in FIG. 1, a fuel injection valve 10 is provided to each cylinder of the engine. A fuel pressure sensor 20 is provided to each fuel injection valve 10. An electronic control unit (ECU) 30 is mounted on a vehicle having the engine.

A fuel injection system having the fuel injection valve 10 will be explained. A fuel in a fuel tank 40 is pumped up by a fuel pump 41 and is accumulated in a common rail (accumulator) 42 to be supplied to each fuel injection valve 10 (#1-#4). The fuel injection valves 10 (#1-#4) perform fuel injections sequentially in a predetermined order. The fuel pump 41 is a plunger pump which intermittently discharges high-pressure fuel.

The fuel injection valve 10 has a body 11, a needle valve 12, an actuator 13 and the like. The body 11 defines a high-pressure passage 11a and an injection port 11b. The needle valve 12 is accommodated in the body 11 to open/close the injection port 11b.

The body 11 defines a backpressure chamber 11c with which the high pressure passage 11a and a low pressure passage 11d communicate. A control valve 14 switches between the high pressure passage 11a and the low pressure passage 11d, so that the high pressure passage 11a communicates with the backpressure chamber 11c or the low pressure passage 11d communicates with the backpressure chamber 11c.

When the actuator 13 is energized, the control valve 14 moves downward in FIG. 1, and the backpressure chamber 11c communicates with the low pressure passage 11d, so that the fuel pressure in the backpressure chamber 11c is decreased. Consequently, the back pressure applied to the needle valve 12 is decreased so that the needle valve 12 is lifted up (opened).

When the actuator 13 is deenergized, the control valve 14 moves upward in FIG. 1, and the backpressure chamber 11c communicates with the high pressure passage 11a, so that the fuel pressure in the backpressure chamber 11c is increased. Consequently, the back pressure applied to the needle valve 12 is increased so that the valve body 12 is lifted down (closed).

The ECU 30 controls the actuator 13 that drives the needle valve 12. When the needle valve 12 opens the injection port 11b, high-pressure fuel in the high pressure passage 11a is injected to a combustion chamber (not shown) of the engine through the injection port 11b.

The fuel pressure sensor 20 includes a stem 21 (load cell), a pressure sensor element 22 and a molded IC 23. The stem 21 is provided to the body 11. The stem 21 has a diaphragm 21a which elastically deforms in response to high fuel pressure in the high-pressure passage 11a. The pressure sensor element 22 is disposed on the diaphragm 21a to output a pressure detection signal depending on an elastic deformation of the diaphragm 21a.

The molded IC 23 includes an amplifier circuit which amplifies a pressure detection signal transmitted from the pressure sensor element 22 and includes a transmitting circuit which transmits the pressure detection signal. A connector 15 is provided on the body 11. The molded IC 23, the actuator 13 and the ECU 30 are electrically connected to each other through a harness 16 (signal wire) connected to the connector 15. The amplified pressure detection signal is transmitted to the ECU 30. Such a signal communication processing is executed with respect to each cylinder.

The ECU 30 computes a target fuel-injection condition (number of stages of fuel injection, fuel-injection-start timing, fuel-injection-end timing, fuel injection quantity and the like) based on the engine load and the engine speed NE, which are derived from an accelerator position. For example, the ECU 30 stores an optimum fuel-injection condition with respect to the engine load and the engine speed as a fuel-injection condition map. Then, based on the current engine load and engine speed, the target fuel-injection condition is computed in view of the fuel-injection condition map.

Figure 2A:
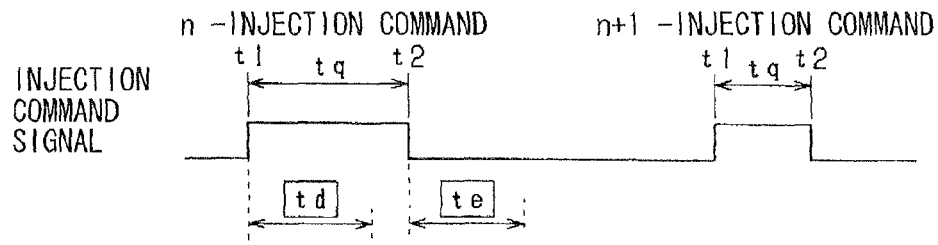
FIG. 2A is a chart illustrating an injection command signal to a fuel injection valve.

Further, the ECU 30 generates fuel-injection-command signals "t1", "t2", "Tq" (see FIG. 2A) corresponding to the computed target fuel-injection condition based on injection rate parameter "td", "te", "Rα", "Rβ" and "Rmax" to be described below. The fuel injection valve 10 is controlled by inputting the signals. The fuel injection is started by the pulse-on timing signal t1, and the fuel injection is ended by the pulse-off timing signal t2. The injection period corresponding to the injection amount is indicated by the pulse-on period Tq.

Due to aging degradation of the injection valve 10 such as wear or clogging of the injection port 11b, an actual injection state changes with respect to the injection command signal.

Figure 2B:
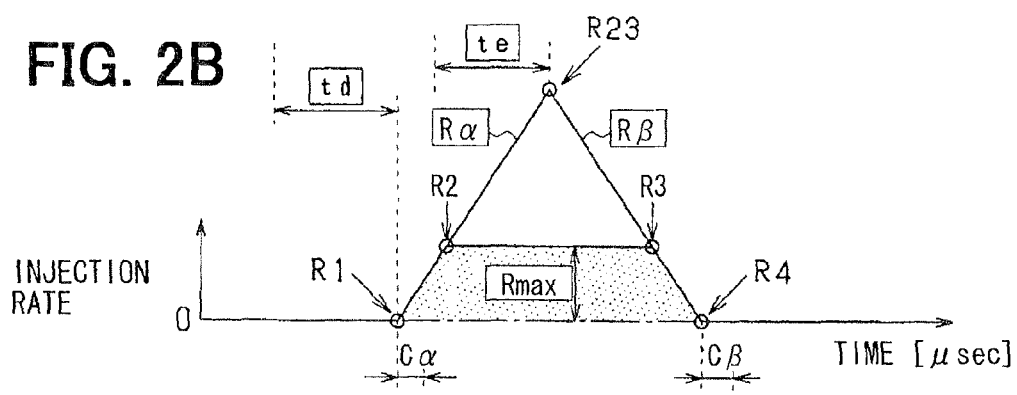
FIG. 2B is a chart illustrating an injection rate waveform indicative of a variation in fuel injection rate.
Figure 2C:
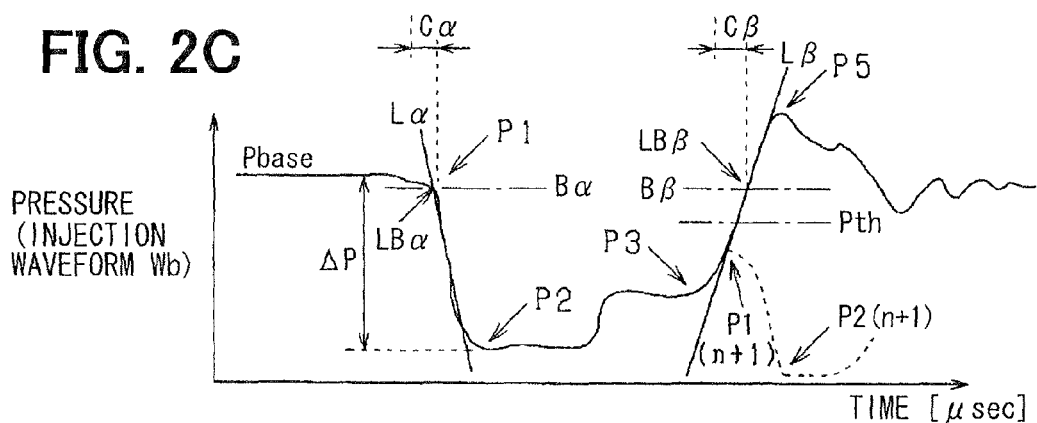
FIG. 2C is a chart illustrating a fuel pressure waveform indicative of a variation in fuel pressure.

As shown in FIG. 2C, a fuel pressure waveform is detected based on detection values of the sensor 20, and corresponds to a variation in fuel pressure when the variation is generated by a fuel injection. Further, as shown in FIG. 2B, injection rate waveform is calculated based on the detected fuel pressure waveform, and represents a variation in injection rate of fuel. Fuel injection state is detected by the calculation of the injection rate waveform. The injection rate parameter "Rα", "Rβ" and "Rmax" that specifies the detected injection rate waveform (injection state) is learned. Further, the injection rate parameter "td", "te" that specifies a relationship between the injection command signal (pulse-on timing "t1", pulse-off timing "t2", and energization time period "Tq") and the injection state is learned. Specifically, as shown in FIG. 2B, injection-start-delay period "td", injection-end-delay period "te", injection-rate increase gradient "Rα", injection-rate decrease gradient "Rβ", and maximum injection rate "Rmax" are learned.

Figure 3:
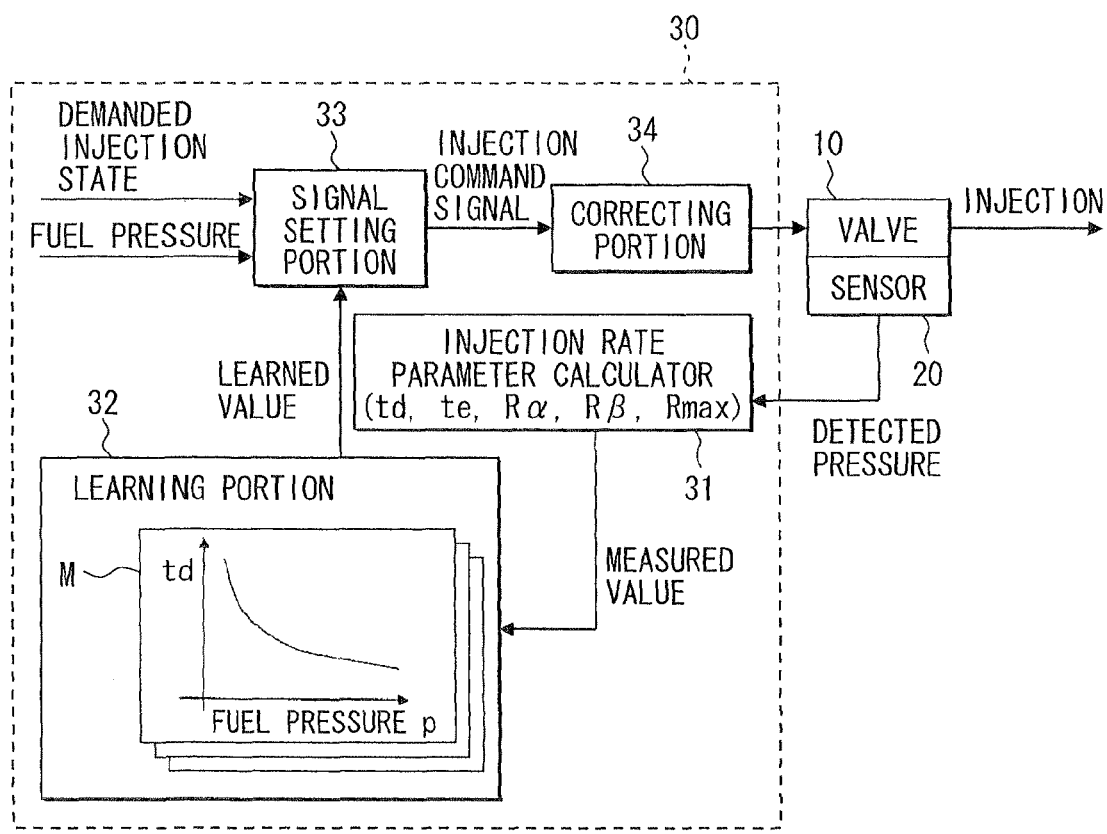
FIG. 3 is a functional block diagram of an ECU which establishes a learning of injection rate parameter and a setting and a correction of the injection command signal.

As shown in FIG. 3, the ECU 30 includes an injection rate parameter calculator 31 corresponding to an injection state analyzer that calculates the injection rate parameter "td", "te", "Rα", "Rβ" and "Rmax" based on the fuel pressure waveform detected by the sensor 20.

A learning portion 32 learns and updates the calculated parameter in a memory of the ECU 30. The parameter changes in accordance with a change in supply fuel pressure (pressure in the common rail 42). Therefore, the learning of the parameter may be related with the supply fuel pressure or a base pressure Pbase to be described below. Further, the other parameters except the maximum injection rate Rmax may be learned with relation to the injection quantity. In FIG. 3, the injection rate parameter values corresponding to fuel pressure are memorized in an injection rate parameter map M.

A signal setting portion 33 obtains the learned parameter corresponding to the present fuel pressure from the map M, and sets the signals t1, t2, Tq corresponding to the target injection state based on the parameter. A fuel pressure waveform obtained when the valve 10 is activated by the signals is detected by the sensor 20. The calculator 31 calculates the parameter "td", "te", "Rα", "Rβ" and "Rmax" based on the detected fuel pressure waveform.

That is, actual injection state (i.e., injection rate parameter "td", "te", "Rα", "Rβ" and "Rmax") corresponding to the injection command signal is detected and learned. New injection command signal is set correspondingly to the target injection state based on the learned value. Thus, feedback control is performed to the command signal based on the actual injection state, so that the fuel injection state can be controlled with high accuracy even if the aging degradation is generated.

However, when the valve 10 is controlled based on the command signal set by the setting portion 33, interval between the injection steps may become zero or smaller than a predetermined value in multi-step-injection. In this case, a correcting portion 34 corrects the command signals in a manner that the interval is increased. The determination method of the interval shortage and the correction method of the command signals will be described in details below.

A processing of calculating the injection rate parameter "td", "te", "Rα", "Rβ" and "Rmax" of FIG. 2B from the detected waveform of FIG. 2C will be described with reference to FIG. 4. The processing is performed by a microcomputer of the ECU 30 every time when a single injection is conducted. The fuel pressure waveform represents an assembly of detection values of the sensor 20 which are obtained with predetermined sampling cycle.

Figure 4:
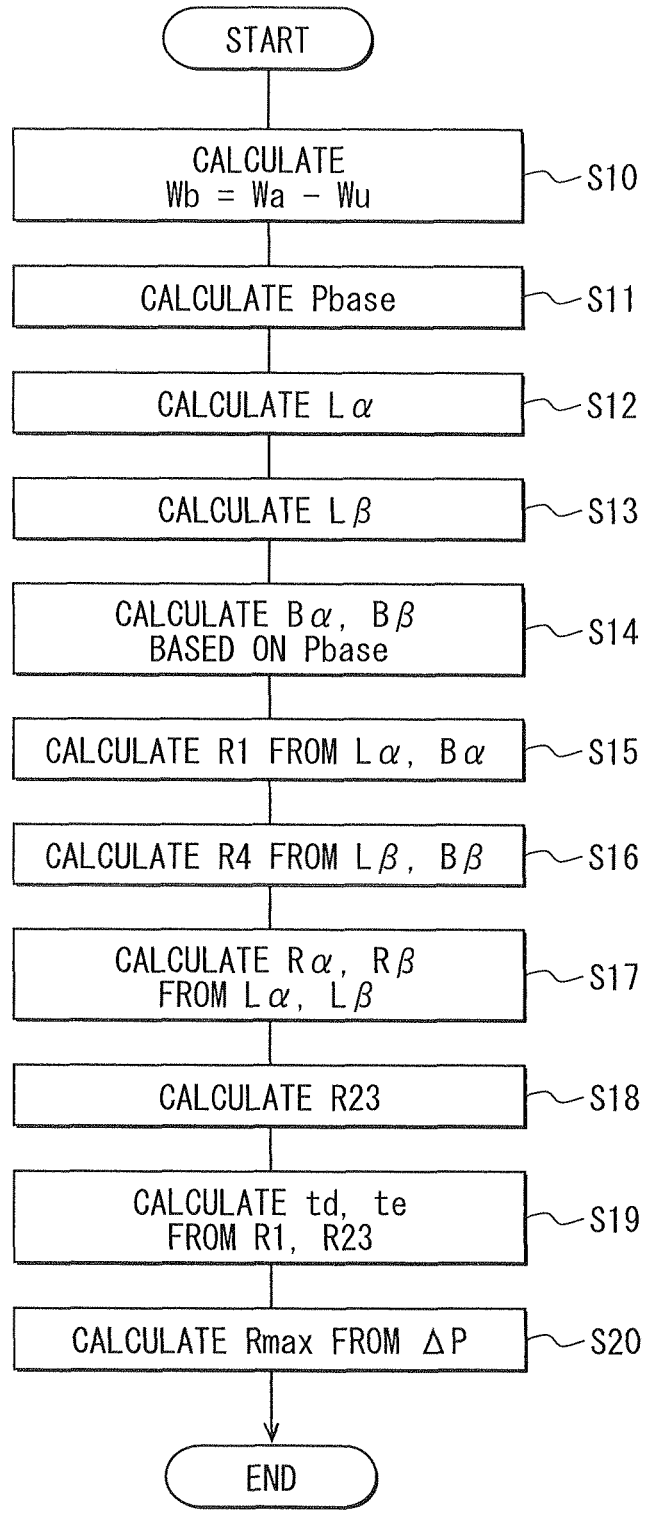
FIG. 4 is a flowchart illustrating a computing process of the injection rate parameter.

In S10 of FIG. 4, an injection waveform Wb (corrected fuel pressure waveform) that is to be used for calculating the injection rate parameter is calculated. A cylinder into which fuel is being injected from the valve 10 is defined as an injection-time cylinder. A cylinder into which fuel is not being injected from the valve 10 when fuel injection is performed in the injection-time cylinder is defined as a non-injection-time cylinder. The sensor 20 corresponding to the injection-time cylinder is defined as an injection-time fuel pressure sensor. The sensor 20 corresponding to the non-injection-time cylinder is defined as a non-injection-time fuel pressure sensor.

Figure 5A:
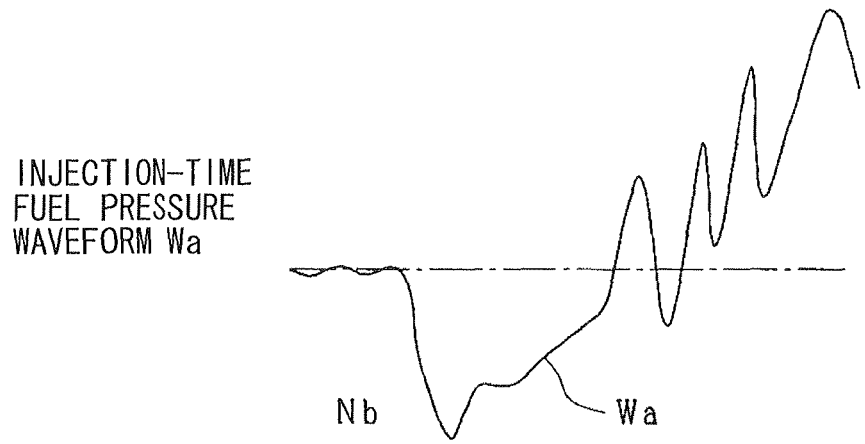
FIG. 5A is a chart illustrating an injection-time fuel pressure waveform.
Figure 5B:
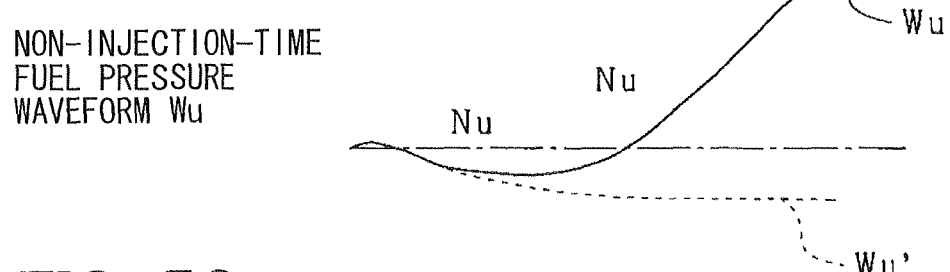
FIG. 5B is a chart illustrating a non-injection-time fuel pressure waveform.
Figure 5C:
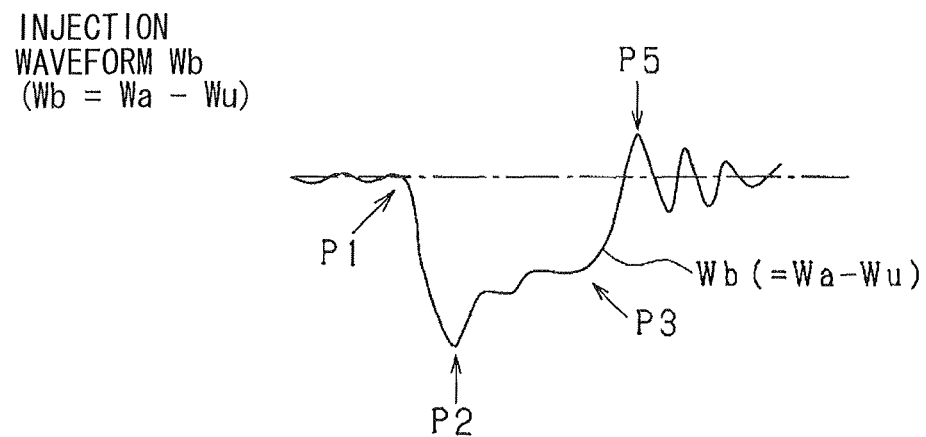
FIG. 5C is a chart illustrating an injection waveform.

An injection-time fuel pressure waveform Wa of FIG. 5A does not represent a waveform that is influenced by only the injection. Rather, the injection-time waveform Wa includes a waveform component caused by influence other than the injection exemplified below. For example, in the case where the fuel pump 41 for pumping fuel in the fuel tank 40 to the common rail 42 intermittently pumps fuel like a plunger pump, if the pumping is performed during the fuel injection, the pressure of the waveform Wa increases during the fuel injection. That is, the injection-time waveform Wa of FIG. 5A includes an injection waveform component Wb of FIG. 5C indicating fuel pressure change due to the injection and a non-injection-time waveform component Wu of FIG. 5B indicating the fuel pressure increase due to the pumping.

Even if the pumping is not performed during the fuel injection, immediately after fuel injection is performed, the fuel pressure in the entire injection system decreases by the injected amounted. Therefore, the injection-time waveform Wa becomes a waveform with pressure decreased as a whole. That is, the injection-time waveform Wa includes the waveform component Wb indicating the fuel pressure change due to the injection and a waveform component Wu' (refer to broken line in FIG. 5B) indicating the fuel pressure decrease in the entire injection system.

In S10 of FIG. 4, the waveform Wb is calculated by subtracting the non-injection-time waveform Wu (Wu') from the injection-time waveform Wa, because the non-injection-time waveform Wu (Wu') represents a variation in the fuel pressure in the common rail (entire injection system). The fuel pressure waveform shown in FIG. 2C represents the injection waveform Wb.

Figure 2D:
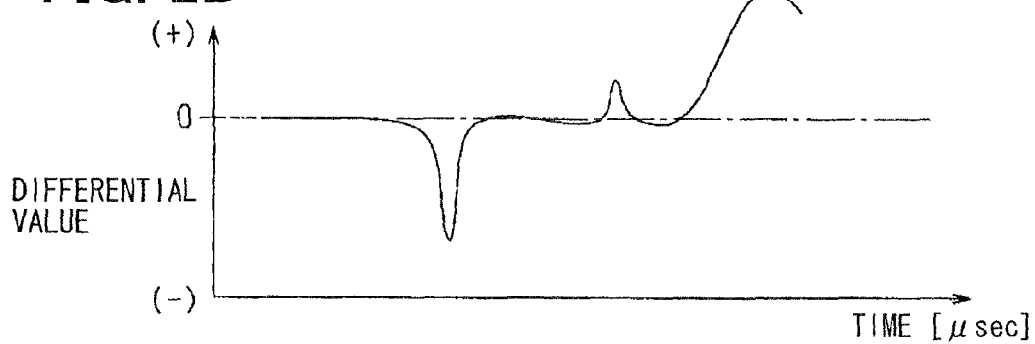
FIG. 2D is a chart illustrating a differential value waveform indicative of a variation in differential value.

In S11, a base pressure Pbase is calculated based on average of the fuel pressure in a base waveform of the injection waveform Wb. The base waveform is defined to correspond to a period started when the injection is started and ended when the fuel pressure starts decreasing. For example, the base waveform may be set to correspond to a period TA of FIG. 2C that is elapsed from the injection start command timing t1. Alternatively, an inflection point P1 of the decreasing waveform of FIG. 2C is calculated based on the differential value of FIG. 2D, and the base waveform may be set to correspond to a period defined from the injection start command timing t1 to a timing that is before the inflection point P1 by a predetermined period.

In S12, an approximation line Lα of the decreasing waveform is calculated based on a decreasing waveform of the injection waveform Wb corresponding to a period while the fuel pressure is decreasing in accordance with increase in the injection rate. For example, the decreasing waveform may be set to correspond to a period TB of FIG. 2C. The period TB is started when a predetermined period is elapsed from the timing t1. Alternatively, an inflection point P1 and an inflection point P2 of the decreasing waveform are calculated based on the differential value of FIG. 2D, and the decreasing waveform may be set to correspond to a period between the inflection point P1 and the inflection point P2. Then, the approximation line Lα may be calculated using least square approximation method from plural detection (sample) values of the fuel pressure constructing the decreasing waveform. Alternatively, a tangent line may be used as the approximation line La at a time when the differential value of the decreasing waveform becomes the smallest.

In S13, an approximation line Lβ of the increasing waveform is calculated based on an increasing waveform of the injection waveform Wb corresponding to a period while the fuel pressure is increasing in accordance with decrease in the injection rate. For example, the increasing waveform may be set to correspond to a period TC started when a predetermined period is elapsed from the timing t2. Alternatively, an inflection point P3 and an inflection point P5 of the increasing waveform are calculated based on the differential value of FIG. 2D, and the increasing waveform may be set to correspond to a period between the inflection point P3 and the inflection point P5. Then, the approximation line Lβ may be calculated using least square approximation method from plural detection (sample) values of the fuel pressure constructing the increasing waveform. Alternatively, a tangent line may be used as the approximation line Lβ at a time when the differential value of the increasing waveform becomes the largest.

In S14, a base value Bα, Bβ of FIG. 2C is calculated based on the base pressure Pbase. For example, the base value Bα, Bβ is set to be lower than the base pressure Pbase by a predetermined value. The base value Bα, and the base value Bβ are not always the same. The predetermined value may be variable in accordance with the base pressure Pbase or temperature of fuel, for example.

In S15, as shown in FIG. 2C, an intersection point between the approximation line Lα and the base value Bα is calculated as an intersection timing LBα. Because the intersection timing LBα and an injection start timing R1 have close correspondence, the injection start timing R1 is calculated based on the intersection timing LBα. For example, the injection start timing R1 may be set before the intersection timing LBα by a predetermined delay period Cα.

In S16, as shown in FIG. 2C, an intersection point between the approximation line Lβ and the base value Bβ is calculated as an intersection timing LBβ. Because the intersection timing LBβ and an injection end timing R4 have close correspondence, the injection end timing R4 is calculated based on the intersection timing LBβ. For example, the injection end timing R4 may be set before the intersection timing LBβ by a predetermined delay period C. The predetermined delay period Cα, Cβ may be variable in accordance with the base pressure Pbase or temperature of fuel, for example.

In S17, because an inclination of the approximation line Lα and an inclination of the increase in the injection rate have close correspondence, an inclination of a line Rα indicative of an injection increase of the injection rate waveform of FIG. 2B is calculated based on the inclination of the approximation line Lα. For example, the inclination of the line Rα may be calculated by multiplying the inclination of the approximation line Lα by a predetermined coefficient. The line Rα indicative of an increasing part of the injection rate waveform with respect to the injection command signal can be specified based on the injection start timing R1 calculated at S15 and the inclination of the line Rα calculated at S17.

Further, in S17, because an inclination of the approximation line Lβ and an inclination of the decrease in the injection rate have close correspondence, an inclination of a line Rβ indicative of an injection decrease of the injection rate waveform is calculated based on the inclination of the approximation line Lβ. For example, the inclination of the line Rβ may be calculated by multiplying the inclination of the approximation line Lβ by a predetermined coefficient. The line Rβ indicative of a decreasing part of the injection rate waveform with respect to the injection command signal can be specified based on the injection end timing R4 calculated at S16 and the inclination of the line Rβ calculated at S17. The predetermined coefficient may be variable in accordance with the base pressure Pbase or temperature of fuel, for example.

In S18, a valve-close-operation start timing R23 is calculated based on the line Rα, Rβ of the injection rate waveform calculated at S17. The valve 12 starts to close at the valve-close-operation start timing R23 when the injection end is ordered. Specifically, an intersection point between the line Rα and the line Rβ is calculated, and the calculated intersection point corresponds to the valve-close-operation start timing R23.

In S19, an injection-start-delay time "td" of the injection start timing R1 calculated at S15 is calculated relative to the injection start command timing t1. Further, an injection-end-delay time "te" of the valve-close-operation start timing R23 calculated at S18 is calculated relative to the injection end command timing t2.

The injection-end-delay time "te" represents a delay time started from the timing t2 at which a signal indicative of the injection end is output to a timing when the operation of the control valve is started. The delay time "td", "te" is a parameter that represents a correspondence delay of the injection rate variation with respect to the injection command signal. There is another delay time, such as a delay time from the injection start command signal t1 to a timing R2 at which the injection rate reaches the maximum value, a delay time from the injection end command signal t2 to a timing R3 at which the injection rate starts to decrease, or a delay time from the injection end command signal t2 to a timing R4 at which the injection is ended.

In S20, a maximum drop amount ΔP of FIG. 2C is calculated from the injection waveform Wb, and a maximum injection rate Rmax is calculated based on the calculated maximum drop amount ΔP, because the maximum drop amount ΔP and the maximum injection rate Rmax have close correspondence. For example, the maximum injection rate Rmax is calculated by multiplying the maximum drop amount ΔP by a predetermined coefficient. The predetermined coefficient may be variable in accordance with the base pressure Pbase or temperature of fuel, for example.

Thus, due to the processing of FIG. 4, the injection rate parameter "td", "te", "Rα", "Rβ" and "Rmax" can be calculated from the injection waveform Wb. Further, the injection rate waveform of FIG. 2B corresponding to the injection command signal of FIG. 2A can be calculated based on the injection rate parameter "td", "te", "Rα", "Rβ" and "Rmax". A hatched area of FIG. 2B of the calculated injection rate waveform corresponds to the injection amount, so that the injection amount can be calculated based on the injection rate parameter. When the injection command period Tq is sufficiently long, and when the valve-opened state is maintained after reaching the maximum injection rate, the injection rate waveform has a trapezoidal shape, as shown in FIG. 2B. In contrast, when the valve starts to be closed before reaching the maximum injection rate, the injection is small and the injection rate waveform has a triangle shape.

The determination of the interval shortage and the correction performed by the correcting portion 34 will be described with reference to FIG. 6. The processing is performed by the microcomputer of the ECU 30 every time when the injection is conducted.

Figure 6:
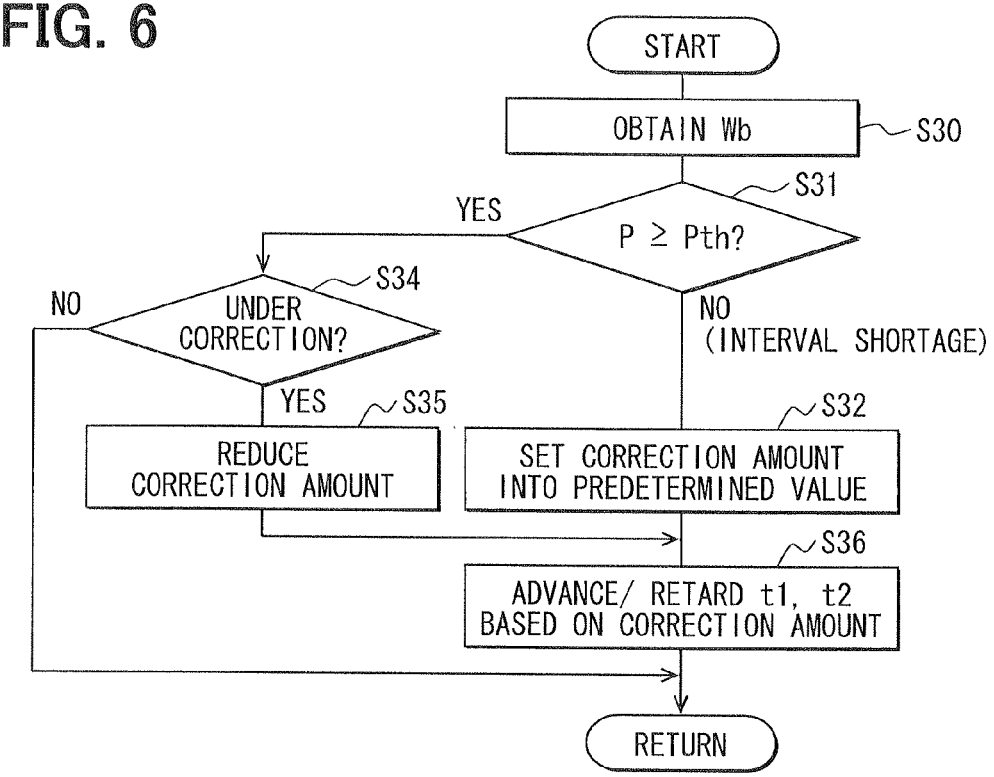
FIG. 6 is a flowchart illustrating a determining processing of interval shortage and a correcting processing of the injection command signal.

As shown in FIG. 6, in S30 corresponding to a fuel pressure waveform detector, the injection waveform Wb that is calculated in S10 of FIG. 4 is obtained.

In S31 corresponding to a determining portion, it is determined whether an interval between the last injection and the next injection is smaller than a predetermined period based on the obtained waveform Wb. That is, determination of the interval shortage is performed.

As shown in a dashed curve of FIG. 2C, an increasing waveform of n-injection overlaps with a decreasing waveform of (n+1)-injection, that is used for calculating the approximation line La, in a case of the interval shortage. That is, an inflection point P1(n+1) of the (n+1)-injection appears in the increasing waveform of the n-injection, so that the increasing waveform starts to decrease. As a result, before a pressure of the increasing waveform of the n-injection reaches a predetermined value Pth, the waveform of the (n+1)-injection starts to decrease. In the present embodiment, it is determined that there is an interval shortage if a pressure of the increasing waveform of the injection waveform Wb that is used for calculating the approximation line Lβ does not reach the predetermined value Pth of FIG. 2C.

The predetermined value Pth is set by subtracting a predetermined value from the base pressure Pbase. That is, the predetermined value Pth is variably set based on the base waveform.

When it is determined that there is the interval shortage (S31:No), a correction amount to be described later is set into a predetermined value at S32. The predetermine value is a fixed value set in advance in a manner that the interval shortage can be cleared in the determination of S31.

In S33, the injection start time t1 and the injection end time t2 of the command signal are corrected by advancing or retarding by the same amount, when an injection of the command signal is determined to have the interval shortage.

Figure 7:
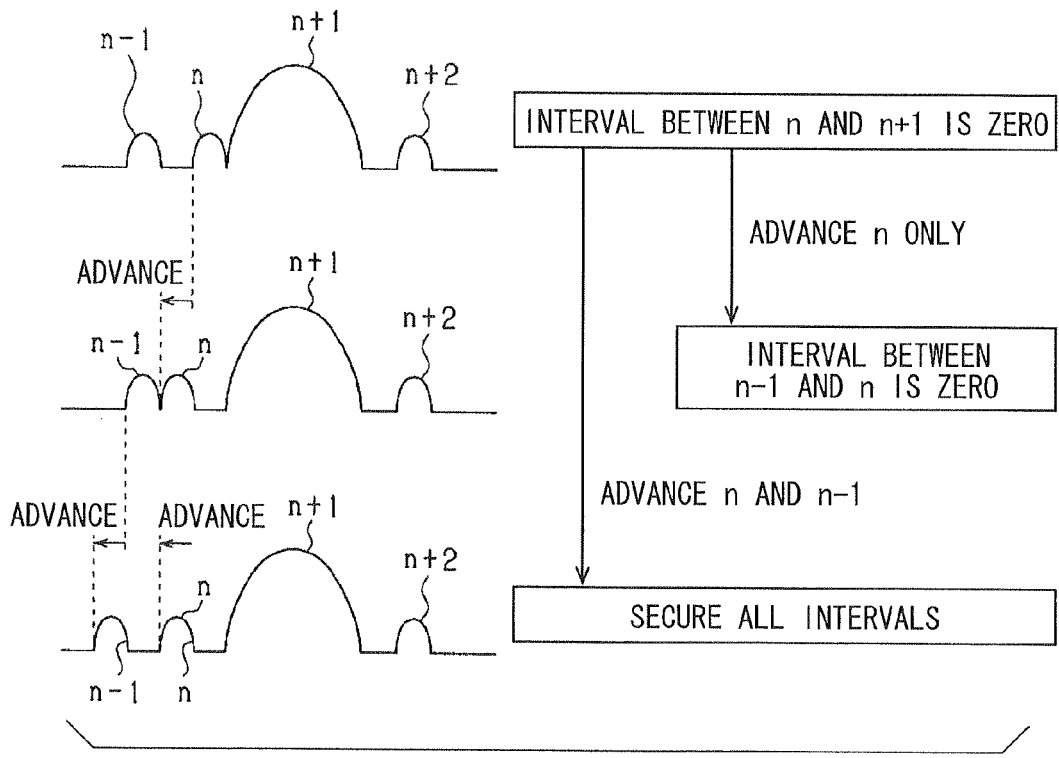
FIG. 7 is a chart illustrating an example of an advance correction performed based on FIG. 6.

FIG. 7 is a time chart illustrating a change in the injection rate when multi-step-injection is performed. When an interval between n-injection and (n+1)-injection is determined to be short, the end timing t2 of the n-injection is corrected in a manner that an interval between the end timing t2 of the n-injection and the start timing t1 of the (n+1)-injection has a predetermined value. The predetermined value is set sufficiently long such that the interval can be secured.

Therefore, the end timing t2 of the n-injection causing the interval shortage is corrected into the advance side, so that the interval between the n-injection and the (n+1)-injection can be secured, as shown in FIG. 7.

In such case where the end timing t2 of the n-injection is corrected into the advance side, a start timing t1 of the n-injection is also corrected into the advance side by the same amount. Thus, the injection amount of the n-injection that corresponds to the injection period Tq is not corrected.

If (n−1)-injection exists (n: positive integer), the advance correction is also conducted to the (n−1)-injection. Specifically, as shown in FIG. 7, the start timing t1 and the end timing t2 of the (n−1)-injection are also corrected into the advance side by the same amount as the correction of the n-injection. Thus, the interval between the n-injection and the (n−1)-injection can be secured after the correction.

There is a case where the interval between the n-injection and the (n−1)-injection can be secured without the correction of the (n−1)-injection, so that the correction of the (n−1)-injection is not always necessary. In a case where the correction of the (n−1)-injection is not performed, if the interval shortage is generated between the corrected n-injection and the (n−1)-injection, it is determined that there is an interval shortage between the n-injection and the (n−1)-injection at S31. Then, the (n−1)-injection is corrected at S33.

In contrast to the advance correction of the n-injection in FIG. 7, as shown in FIG. 8, alternatively, a retard correction may be performed for the (n+1)-injection. That is, when the interval between the n-injection and the (n+1)-injection is determined to be short, the start timing t1 of the (n+1)-injection is corrected in a manner that an interval between the end timing t2 of the n-injection and the start timing t1 of the (n+1)-injection has a predetermined value. Therefore, the start timing t1 of the (n+1)-injection causing the interval shortage is corrected into the retard side.

In such case where the start timing t1 of the (n+1)-injection is corrected into the retard side, the end timing t2 of the (n+1)-injection is also corrected into the retard side by the same amount. Thus, the injection amount of the (n+1)-injection that corresponds to the injection period Tq is not corrected.

If (n+2)-injection exists (n: positive integer), the retard correction is also conducted to the (n+2)-injection. Specifically, as shown in FIG. 8, the start timing t1 and the end timing t2 of the (n+2)-injection are also corrected into the retard side by the same amount as the correction of the (n+1)-injection. Thus, the interval between the (n+1)-injection and the (n+2)-injection can be secured after the correction.

There is a case where the interval between the (n+1)-injection and the (n+2)-injection can be secured without the correction of the (n+2)-injection, so that the correction of the (n+2)-injection is not always necessary.

The advance correction of the n-injection shown in FIG. 7 and the retard correction of the (n+1)-injection shown in FIG. 8 may be performed at the same time. That is, the end timing t2 of the n-injection is corrected into the advance side, and the start timing t1 of the (n+1)-injection is corrected into the retard side, in a manner that an interval between the end timing t2 of the n-injection and the start timing t1 of the (n+1)-injection has a predetermined value.

When it is determined that the interval shortage is eliminated in S31 of FIG. 6 (S31:Yes), it is determined whether the fuel pressure waveform Wb used for the determination of S31 is based on an injection having the above correction. That is, it is determined whether the interval shortage is cleared under the correction.

When it is determined that the correction is being performed (S34:Yes), the correction amount used in S33 is reduced by a predetermined amount at S35. For example, after the correction is performed when the interval shortage is detected, even if the interval shortage is eliminated by the correction, the correction amount is gradually decreased without immediate stop of the correction. When the correction amount becomes zero in S34, the correction in S33 is ended.

Advantages of the embodiment will be described below.

In the case of the interval shortage, the injection command signal is corrected in a manner that the interval is increased at the next injection. Therefore, integration of the injections shown in a dashed line of FIG. 9C can be prevented. Thus, gas emission properties can be restricted from becoming worse, and the engine output torque can be restricted from having large variation. Further, a temperature of the engine can be restricted from becoming too high because single injection of a large amount of fuel is restricted.

The interval shortage is determined based on a comparison between the pressure of the increasing waveform and the predetermined pressure Pth. Therefore, a processing load of the microcomputer of the ECU 30 can be reduced compared with a case where the interval shortage is determined by calculating actual interval based on analysis result of the end timing R4 of the n-injection and the start timing R1 of the (n+1)-injection.

The predetermined pressure Pth used for the determination of the interval shortage is variably set in accordance with the base pressure Pbase of the base waveform. The interval shortage is determined based on the waveform Wb obtained by subtracting the non-injection-time waveform Wu from the injection-time waveform Wa. Thus, determination accuracy of the interval shortage can be raised.

If the interval shortage is cleared under the correction, the correction is continued where the correction amount is reduced for each determination that the interval shortage is cancelled. Therefore, regeneration of the interval shortage can be reduced.

The injection rate parameter such as the injection start delay time "td" or the injection end delay time "te" is learned, and the injection command signal is set based on the learned value. Therefore, it is expected that the interval can become to be controlled with high accuracy after the learning is ended, that is when the correction amount becomes zero in S35. The correction may work as fail-safe before the learning is sufficiently performed. Thus, regeneration of the interval shortage can be reduced.

In S33, the correction is performed by the same amount relative to the start timing t1 and the end timing t2, so that the injection amount is not changed. Therefore, a required combustion state can be achieved without having a large variation.

In S33, an injection immediately before or after the injection that is determined to have the interval shortage is also corrected by the same amount. Therefore, the injection that is not determined to have the interval shortage can be restricted from having the interval shortage.

Other Embodiments

The present invention is not limited to the above description, and may be practiced in the following modified states.

When multi-step-injection is performed, an injection that has the largest injection amount is defined as a main injection. An injection timing of the main injection has a large influence for the injection state compared with the other injections. If the main injection has an interval shortage, correction is made for injection before and/or after the main injection, without correction of the main injection. Thus, the injection state can be restricted from having a large variation when the correction is performed.

In FIGS. 7 and 8, the (n+1)-injection corresponds to the main injection, so that the correction of the n-injection corresponding to a pilot injection may be better than the correction of the (n+1)-injection.

If a foreign object exits in a sliding part between the valve 12 and the body 11, injection is abnormally continued, because the valve cannot be completely closed. In this case, erroneous determination of the interval shortage may be generated in S31 of FIG. 6.

If S31 is defined to start when the next injection is commanded in a predetermined time after the injection end is commanded, the abnormal injection and the interval shortage can be distinguished from each other.

In S31, the interval shortage is determined when the increasing waveform does not reach the predetermined pressure Pth. Alternatively, actual interval may be calculated based on the end timing R4 and the start timing R1 calculated at the processing of FIG. 4, and it is determined that there is an interval shortage when the actual interval is smaller than a predetermined period Tth.

The fuel pressure sensor 20 is mounted to the fuel injection valve 10 in the above description. The sensor 20 is located to detect a pressure of fuel in a fuel supply passage extending from an outlet 42a of the common rail 42 to the injection port 11b. For example, the fuel pressure sensor 20 may be arranged in a high pressure pipe 42b that connects the common rail 42 to the fuel injection valve 10. That is, the high pressure pipe 42b or the high pressure passage 11a may correspond to a fuel passage.

Such changes and modifications are to be understood as being within the scope of the present invention as defined by the appended claims.

What is claimed is:

1. A fuel injection control device comprising:
   a fuel injection valve configured to inject fuel accumulated in an accumulator;
   a fuel pressure sensor configured to detect a fuel pressure in a fuel passage defined to extend from an outlet of the accumulator to an injection port of the fuel injection valve;
   a command portion configured to set an injection command signal indicative of an injection start timing and an injection end timing based on a target injection state that is set in accordance with an operation state of an engine, and output the injection command signal into the fuel injection valve;
   a waveform detector configured to detect a variation in fuel pressure based on a detection value of the fuel pressure sensor as a fuel pressure waveform when the variation is generated by a fuel injection;
   a determining portion configured to determine whether an interval between injections is zero or smaller than a predetermined value based on the detected fuel pressure waveform when multi-step-injection is performed; and
   a correcting portion configured to correct the injection command signal corresponding to the target injection state in a manner that the interval is increased when the interval is determined to be zero or smaller than the predetermined value; wherein:
   the detected fuel pressure waveform has an increasing waveform where the fuel pressure is increased in accordance with a decrease in injection rate;
   the determining portion is further configured to determine whether the interval is zero or smaller than the predetermined value based on a pressure of the increasing waveform;
   the determining portion is further configured to determine that the interval is zero or smaller than the predetermined value if the pressure of the increasing waveform does not reach a predetermined pressure;
   the detected fuel waveform has a base waveform before the fuel pressure starts to decrease in accordance with an increase in injection rate; and
   the predetermined pressure is set variable in accordance with a base pressure calculated based on the base waveform.

2. The fuel injection control device according to claim 1, wherein
   the correcting portion is further configured to correct the injection command signal in a manner that the interval has a predetermined period when the interval is determined to be zero or smaller than the predetermined value, and
   the correction is continued by reducing the predetermined period every time when the interval is determined to be equal to or larger than the predetermined value.

3. The fuel injection control device according to claim 1, further comprising:
   a parameter calculator configured to calculate an injection rate parameter based on the detected fuel pressure waveform, the injection rate parameter being necessary for specifying an injection rate waveform corresponding to the fuel pressure waveform; and
   a parameter learning portion configured to learn the calculated injection rate parameter, wherein
   the injection command signal corresponding to the target injection state is set based on the learned injection rate parameter.

4. The fuel injection control device according to claim 1, wherein
   the correcting portion is further configured to correct the injection command signal by advancing/retarding the injection start timing and the injection end timing by the same value in a manner that an injection period corresponding to the target injection state is not varied.

5. The fuel injection control device according to claim 4, wherein
   the correcting portion is further configured to correct the injection command signal in a manner that an interval between n-injection and (n+1)-injection is increased in multi-step-injection,
   in a case where the interval is increased by advancing the injection start timing and the injection end timing of the n-injection by a predetermined value, the injection start timing and the injection end timing of (n−1)-injection are advanced by the predetermined value, and
   in a case where the interval is increased by retarding the injection start timing and the injection end timing of the (n+1)-injection by a predetermined value, the injection start timing and the injection end timing of (n+2)-injection are retarded by the predetermined value.

6. A fuel injection control device comprising:
   a fuel injection valve configured to inject fuel accumulated in an accumulator;

a fuel pressure sensor configured to detect a fuel pressure in a fuel passage defined to extend from an outlet of the accumulator to an injection port of the fuel injection valve;

an electronic control unit, including a computer, the electronic control unit being at least configured to:

set an injection command signal indicative of an injection start timing and an injection end timing based on a target injection state that is set in accordance with an operation state of an engine, and output the injection command signal into the fuel injection valve;

detect a variation in fuel pressure based on a detection value of the fuel pressure sensor as a fuel pressure waveform when the variation is generated by a fuel injection, the detected fuel pressure waveform having an increasing waveform where the fuel pressure is increased in accordance with a decrease in injection rate;

determine whether an interval between injections is zero or smaller than a predetermined value based on the detected fuel pressure waveform when multi-step-injection is performed;

correct the injection command signal corresponding to the target injection state in a manner that the interval is increased when the interval is determined to be zero or smaller than the predetermined value;

determine whether the interval is zero or smaller than the predetermined value based on a pressure of the increasing waveform; and determine that the interval is zero or smaller than the predetermined value if the pressure of the increasing waveform does not reach a predetermined pressure; wherein:

the detected fuel pressure waveform has a base waveform before the fuel pressure starts to decrease in accordance with an increase in injection rate, and the predetermined pressure is set variable in accordance with a base pressure calculated based on the base waveform.

7. The fuel injection control device according to claim 6, wherein the electronic control unit is further configured to correct the injection command signal in a manner that the interval has a predetermined period when the interval is determined to be zero or smaller than the predetermined value, and the correction is continued by reducing the predetermined period every time when the interval is determined to be equal to or larger than the predetermined value.

8. The fuel injection control device according to claim 6, the electronic control unit is further configured at least to:

calculate an injection rate parameter based on the detected fuel pressure waveform, the injection rate parameter being necessary for specifying an injection rate waveform corresponding to the fuel pressure waveform; and learn the calculated injection rate parameter, wherein the injection command signal corresponding to the target injection state is set based on the learned injection rate parameter.

9. The fuel injection control device according to claim 6, wherein the electronic control unit is further configured to correct the injection command signal by advancing/retarding the injection start timing and the injection end timing by the same value in a manner that an injection period corresponding to the target injection state is not varied.

10. The fuel injection control device according to claim 9, wherein the electronic control unit is further configured to correct the injection command signal in a manner that an interval between n-injection and (n+1)-injection is increased in multi-step-injection, in a case where the interval is increased by advancing the injection start timing and the injection end timing of the n-injection by a predetermined value, the injection start timing and the injection end timing of (n−1)-injection are advanced by the predetermined value, and in a case where the interval is increased by retarding the injection start timing and the injection end timing of the (n+1)-injection by a predetermined value, the injection start timing and the injection end timing of (n+2)-injection are retarded by the predetermined value.

* * * * *